US011327651B2

(12) United States Patent
Richardson et al.

(10) Patent No.: US 11,327,651 B2
(45) Date of Patent: May 10, 2022

(54) VIRTUAL KEYBOARD BASED ON ADAPTIVE LANGUAGE MODEL

(71) Applicant: Facebook Technologies, LLC, Menlo Park, CA (US)

(72) Inventors: Mark A. Richardson, Seattle, WA (US); Robert Y. Wang, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/789,079

(22) Filed: Feb. 12, 2020

(65) Prior Publication Data

US 2021/0247900 A1     Aug. 12, 2021

(51) Int. Cl.
| | |
|---|---|
| *G06F 3/0488* | (2013.01) |
| *G06F 3/04886* | (2022.01) |
| *G06F 3/01* | (2006.01) |
| *G06F 3/04883* | (2022.01) |

(52) U.S. Cl.
CPC .......... *G06F 3/04886* (2013.01); *G06F 3/013* (2013.01); *G06F 3/04883* (2013.01)

(58) Field of Classification Search
CPC ... G06F 3/04886; G06F 3/013; G06F 3/04883
See application file for complete search history.

(56) References Cited

U.S. PATENT DOCUMENTS

| | | | | |
|---|---|---|---|---|
| 7,042,442 | B1 * | 5/2006 | Kanevsky | G06F 3/017 |
| | | | | 345/157 |
| 8,959,013 | B2 * | 2/2015 | Galor | G06F 40/274 |
| | | | | 704/9 |
| 9,996,524 | B1 * | 6/2018 | Hwang | H04W 4/14 |
| 9,996,797 | B1 * | 6/2018 | Holz | G06F 3/04842 |
| 2008/0126075 | A1 * | 5/2008 | Thorn | G06F 3/0237 |
| | | | | 704/3 |
| 2008/0285857 | A1 * | 11/2008 | Sharan | G06F 3/0237 |
| | | | | 382/209 |
| 2010/0289752 | A1 | 11/2010 | Birkler | |
| 2012/0036468 | A1 | 2/2012 | Colley | |
| 2012/0047025 | A1 * | 2/2012 | Strohman | G06F 16/9535 |
| | | | | 705/14.71 |

(Continued)

OTHER PUBLICATIONS

International Search Report on non-Foley case related to U.S. Appl. No. 16/789,079 dated Apr. 26, 2021 (13 pages).

*Primary Examiner* — Ryan F Pitaro
(74) *Attorney, Agent, or Firm* — Foley & Lardner LLP

(57) ABSTRACT

Disclosed herein are related to systems and methods for providing inputs through a virtual keyboard with an adaptive language model. In one approach, one or more processors determine whether a user intended to provide semantically meaningful characters or not, when providing a hand motion or a hand pose with respect to a virtual keyboard. The virtual keyboard may be located on a surface without physical keys. In one approach, the one or more processors determine an input to the virtual keyboard based on the hand motion or the hand pose. In one approach, the one or more processors determine weight of a language model according to the determined user intention. In one approach, the one or more processors modify the detected input according to the determined weight of the language model.

17 Claims, 8 Drawing Sheets

(56) References Cited

U.S. PATENT DOCUMENTS

| | | | |
|---|---|---|---|
| 2012/0167009 A1* | 6/2012 | Davidson | G06F 3/0237 715/816 |
| 2013/0321279 A1* | 12/2013 | Engle | G06F 3/017 345/168 |
| 2014/0025371 A1* | 1/2014 | Min | G06Q 10/10 704/9 |
| 2014/0062886 A1* | 3/2014 | Pasquero | G06F 3/04886 345/168 |
| 2014/0129210 A1* | 5/2014 | Convertino | G06F 40/30 704/9 |
| 2015/0084884 A1* | 3/2015 | Cherradi El Fadili | G06F 3/0233 345/173 |
| 2015/0220150 A1* | 8/2015 | Plagemann | G06F 3/017 715/856 |
| 2015/0363038 A1* | 12/2015 | Luo | G06F 3/0488 345/173 |
| 2016/0187998 A1* | 6/2016 | Singh | G06F 3/013 345/168 |
| 2016/0253044 A1* | 9/2016 | Katz | G06F 3/04842 345/156 |
| 2016/0253299 A1 | 9/2016 | Mese et al. | |
| 2017/0068316 A1* | 3/2017 | Seok | G06F 3/0237 |
| 2017/0090749 A1* | 3/2017 | Marsden | G06F 3/04886 |
| 2017/0147202 A1* | 5/2017 | Donohue | G06F 3/04886 |
| 2017/0168711 A1 | 6/2017 | Temple | |
| 2017/0185287 A1* | 6/2017 | Unruh | G06F 3/0216 |
| 2017/0262045 A1* | 9/2017 | Rouvinez | G06F 3/011 |
| 2017/0293402 A1* | 10/2017 | Morris | G06F 3/04886 |
| 2018/0173417 A1* | 6/2018 | Foresti | G06F 3/013 |
| 2018/0314343 A1 | 11/2018 | Montaldi et al. | |
| 2019/0113966 A1* | 4/2019 | Connellan | G01S 5/16 |
| 2020/0042172 A1* | 2/2020 | Goulden | G06F 3/04886 |
| 2021/0011621 A1* | 1/2021 | Becker | G06F 3/011 |
| 2021/0097142 A1* | 4/2021 | Breedvelt-Schouten | G06F 40/253 |

* cited by examiner

400A

400B

VIRTUAL KEYBOARD BASED ON ADAPTIVE LANGUAGE MODEL

FIELD OF DISCLOSURE

The present disclosure is generally related to providing inputs for artificial reality such as a virtual reality (VR), an augmented reality (AR) or a mixed reality (MR), including but not limited to providing inputs to the artificial reality with improved accuracy based on adaptive language model.

BACKGROUND

A physical keyboard is an input device allowing a user to provide complex inputs to a computing device. For example, a physical keyboard includes various keys allowing a user to provide a combination of various characters in a prompt manner. In one aspect, when a user of the physical keyboard presses a key corresponding to a character, the user receives a kinesthetic feedback. Based on this kinesthetic feedback, the user may orient his hand without looking at the keyboard, and press other keys of the physical keyboard to provide other characters as an input with a high degree of accuracy. Despite the advantages of the physical keyboard, the physical keyboard may consume a large space, and may not be portable.

A virtual keyboard is a virtually created keyboard that allows a user to provide inputs to the computing device without physical keys of a physical keyboard. For example, a user performs, on a surface corresponding to a virtual keyboard, a certain hand motion or a hand pose for typing a certain key of the physical keyboard. Such hand motion or hand pose with respect to the virtual keyboard can be detected, and a character corresponding to the hand motion or the hand pose can be provided as an input to the computing device. Unlike the physical keyboard, the virtual keyboard does not occupy a physical space, and may be portable. However, a virtual keyboard may not provide kinesthetic feedback to help guide the user, and may result in a lower accuracy of inputs as compared to the physical keyboard.

SUMMARY

Various embodiments disclosed herein are related to a method of providing inputs through a virtual keyboard. In some embodiments, the method includes determining, by one or more processors, a level of focus of a user when providing a hand motion (e.g., including at least one hand pose and/or position) with respect to a virtual keyboard. In some embodiments, the method includes detecting, by the one or more processors, an input to the virtual keyboard based on the hand motion. In some embodiments, the method includes determining, by the one or more processors, weight of a language model according to the determined level of focus of the user. In some embodiments, the method includes modifying, by the one or more processors, the detected input according to the determined weight of the language model.

In some embodiments, determining the level of focus of the user when providing the hand motion includes determining, by the one or more processors, an orientation of a head of the user. In some embodiments, determining the weight of the language model includes determining, by the one or more processors, the weight to be a first value, in response to determining that the head is oriented to face towards the virtual keyboard. In some embodiments, determining the weight of the language model includes determining, by the one or more processors, the weight to be a second value, in response to determining that the head is oriented to face away from the virtual keyboard. The second value may be higher than the first value.

In some embodiments, determining the level of focus of the user when providing the hand motion includes determining, by the one or more processors, a gaze direction of the user. In some embodiments, determining the weight of the language model includes determining, by the one or more processors, the weight to be a first value, in response to determining that the gaze direction of the user is directed to the virtual keyboard. In some embodiments, determining the weight of the language model includes determining, by the one or more processors, the weight to be a second value, in response to determining that the gaze direction of the user is away from the virtual keyboard. The second value may be higher than the first value.

In some embodiments, determining the level of focus of the user when providing the hand motion includes determining, by the one or more processors, a speed of the hand motion. In some embodiments, determining the weight of the language model includes determining, by the one or more processors, the weight to be a first value, in response to determining that the speed of the hand motion is less than a predetermined threshold. In some embodiments, determining the weight of the language model includes determining, by the one or more processors, the weight to be a second value, in response to determining that the speed of the hand motion is higher than the predetermined threshold. The second value may be higher than the first value.

In some embodiments, the method includes determining, by the one or more processors, a type of content corresponding to the input. The weight of the language model may be determined according to the determined type of content. In some embodiments, modifying, by the one or more processors, the detected input according to the determined weight of the language model includes determining, by the one or more processors, a distribution of first characters in the detected input during a time period. In some embodiments, modifying, by the one or more processors, the detected input according to the determined weight of the language model includes predicting, by the one or more processors via the language model according to the determined weight and the distribution of the first characters, where one or more characters may be different from one or more corresponding characters in the first characters. In some embodiments, modifying, by the one or more processors, the detected input according to the determined weight of the language model includes replacing the one or more corresponding characters with the predicted one or more characters.

Various embodiments disclosed herein are related to a device for providing inputs through a virtual keyboard. In some embodiments, the device includes at least one processor configured to determine a level of focus of a user when providing a hand motion with respect to a virtual keyboard. In some embodiments, the at least one processor is configured to detect an input to the virtual keyboard based on the hand motion. In some embodiments, the at least one processor is configured to determine weight of a language model according to the determined level of focus of the user. In some embodiments, the at least one processor is configured to modify the detected input according to the determined weight of the language model.

In some embodiments, the at least one processor is configured to determine the level of focus of the user when providing the hand motion by determining an orientation of a head of the user. In some embodiments, the at least one processor is configured to determine the level of focus of the user when providing the hand motion by determining a gaze direction of the user. In some embodiments, the at least one processor is configured to determine the level of focus of the user when providing the hand motion by determining a speed of the hand motion. In some embodiments, the at least one processor is configured to determine a type of content corresponding to the input. The at least one processor may be configured to determine the weight of the language model according to the determined type of content.

In some embodiments, the at least one processor is configured to modify the detected input according to the determined weight of the language model by determining a distribution of first characters in the detected input during a time period. In some embodiments, the at least one processor is configured to modify the detected input according to the determined weight of the language model by predicting, via the language model according to the determined weight and the distribution of the first characters, where one or more characters may be different from one or more corresponding characters in the first characters. In some embodiments, the at least one processor is configured to modify the detected input according to the determined weight of the language model by replacing the one or more corresponding characters with the predicted one or more characters.

Various embodiments disclosed herein are related to a non-transitory computer readable medium storing instructions for providing inputs through a virtual keyboard. In some embodiments, the instructions when executed by at least one processor cause the at least one processor to determine a level of focus of a user when providing a hand motion with respect to a virtual keyboard. In some embodiments, the instructions when executed by at least one processor cause the at least one processor to detect an input to the virtual keyboard based on the hand motion. In some embodiments, the instructions when executed by at least one processor cause the at least one processor to determine weight of a language model according to the determined level of focus of the user. In some embodiments, the instructions when executed by at least one processor cause the at least one processor to modify the detected input according to the determined weight of the language model.

In some embodiments, the instructions when executed by the at least one processor cause the at least one processor to determine the level of focus of the user when providing the hand motion by determining an orientation of a head of the user. In some embodiments, the instructions when executed by the at least one processor cause the at least one processor to determine the level of focus of the user when providing the hand motion, by determining a gaze direction of the user. In some embodiments, the instructions when executed by the at least one processor cause the at least one processor to determine the level of focus of the user when providing the hand motion by determining a speed of the hand motion. In some embodiments, the instructions when executed by the at least one processor cause the at least one processor to determine a type of content corresponding to the input, and determine the weight of the language model according to the determined type of content.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1:
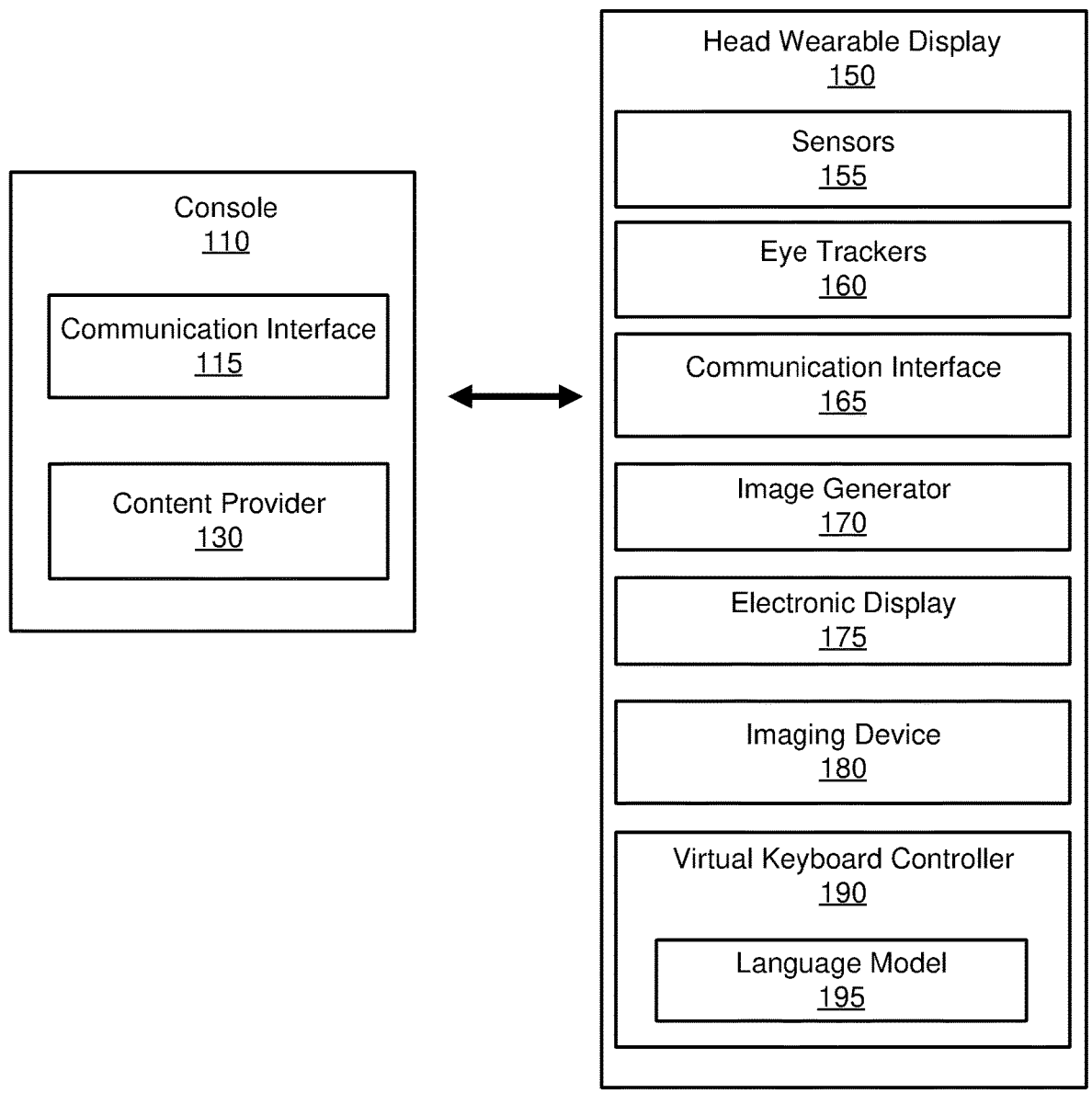
FIG. 1 is a diagram of a system environment including an artificial reality system, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are related to systems and methods for providing inputs through a virtual keyboard with an adaptive language model. In one approach, one or more processors determine whether a user intended to provide semantically meaningful characters, word, and/or sentences or not, when providing a hand motion (e.g., including at least one hand pose, trajectory and/or position) and/or a hand pose with respect to a virtual keyboard. The virtual keyboard may be located on and/or registered with a surface without physical keys. In one approach, the one or more processors may determine or predict an input to the virtual keyboard based on the hand motion and/or the hand pose. In one approach, the one or more processors can determine a weight of a language model according to the determined user intention. In one approach, the one or more processors can modify the detected input according to the determined weight of the language model.

Advantageously, adaptively modifying an input provided to the virtual keyboard via a language model can improve an accuracy of determining or predicting the input provided. In one aspect, inputs to the virtual keyboard based on the hand motion or the hand pose may be susceptible to errors, because the virtual keyboard cannot provide any kinesthetic feedback. Without a kinesthetic feedback, a user may perform a hand motion and/or a hand pose different from his/her intention (e.g., an intended input). For example, the user may have intended to perform a hand motion or a hand pose corresponding pressing keys "C", "A", "T" of a physical keyboard, but because of a lack of kinesthetic feedback the user may have performed a hand motion or a hand pose corresponding to "C", "Q", "T", instead, as detected, determined or predicted by hand-pose sensors (e.g., image sensors) for instance. In one aspect, the user's intention of providing semantically meaningful characters, word, and/or sentences or not, can be predicted or determined, for example, based on a focus level of the user and/or a type of content of the input, and a language model can be adaptively applied according to the user intention to correct the input detected based on the hand motion and/or the hand pose. For example, i) if the user gazes towards his hands or fingers when providing the input with respect to the virtual keyboard, ii) if the speed of the hand motion provided with respect to the virtual keyboard is decreased, irregular and/or non-constant (e.g., over a period of time), or iii) if the type of content is for providing a password or a proper noun for instance, then less correction on the input can be performed by the language model. For example, i) if the user gazes away from his hands or fingers when providing the input with respect to the virtual keyboard, ii) if the speed of the hand motion provided with respect to the virtual keyboard is increased, constant and/or within a range, or iii) if the type of content is for providing texts in emails or chat applications for instance, then more correction on the input can be performed by the language model. Accordingly, a level or extent of correction by the language model can be adaptively adjusted or performed, according to the user's intention of providing a semantically meaningful word or not.

FIG. 1 is a block diagram of an example artificial reality system environment 100 in which a console 110 operates. In some embodiments, the artificial reality system environment 100 includes a HWD 150 worn by a user, and a console 110 providing content of artificial reality to the HWD 150. A head wearable display (HWD) may be referred to as, include, or be part of a head mounted display (HMD), head mounted device (HMD), head wearable device (HWD), head worn display (HWD) or head worn device (HWD). In one aspect, the HWD 150 may detect its location and a gaze direction of the user wearing the HWD 150, and provide the detected location and the gaze direction to the console 110. The console 110 may determine a view within the space of the artificial reality corresponding to the detected location and the gaze direction, and generate an image depicting the determined view. The console 110 may provide the image to HWD 150 for rendering. In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the console 110 may be performed by the HWD 150. For example, some of the functionality of the HWD 150 may be performed by the console 110. In some embodiments, the console 110 is integrated as part of the HWD 150.

In some embodiments, the HWD 150 is an electronic component that can be worn by a user and can present or provide an artificial reality experience to the user. The HWD 150 may render one or more images, video, audio, or some combination thereof to provide the artificial reality experience to the user. In some embodiments, audio is presented via an external device (e.g., speakers and/or headphones) that receives audio information from the HWD 150, the console 110, or both, and presents audio based on the audio information. In some embodiments, the HWD 150 includes sensors 155, eye trackers 160, a communication interface 165, an image renderer 170, an electronic display 175, an imaging device 180, and a virtual keyboard controller 190. These components may operate together to detect a location and an orientation of the HWD 150 and/or a gaze direction of the user wearing the HWD 150, and render an image of a view within the artificial reality corresponding to the detected location and orientation of the HWD 150 and/or the gaze direction of the user. In other embodiments, the HWD 150 includes more, fewer, or different components than shown in FIG. 1.

In some embodiments, the sensors 155 include electronic components or a combination of electronic components and software components that detect a location and an orientation of the HWD 150. Examples of sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and/or the rotational movement, and determine an orientation and/or location of the HWD 150. In one aspect, the sensors 155 can detect the translational movement and the rotational movement with respect to a previous orientation and/or location of the HWD 150, and determine a new orientation and location of the HWD 150 by accumulating or integrating the detected translational movement and/or the rotational movement. Assuming for example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the eye trackers 160 include electronic components or a combination of electronic components and software components that determine a gaze direction of the user of the HWD 150. In some embodiments, the eye trackers 160 include two eye trackers, where each eye tracker 160 captures an image of a corresponding eye and determines a gaze direction of the eye. In one example, the eye tracker 160 determines an angular rotation of the eye, a translation of the eye, a change in the torsion of the eye, and/or a change in shape of the eye, according to the captured image of the eye, and determines the relative gaze direction with respect to the HWD 150, according to the determined angular rotation, translation and the change in the torsion of the eye. In one approach, the eye tracker 160 may shine or project a predetermined reference or structured pattern on a portion of the eye, and capture an image of the eye to analyze the pattern projected on the portion of the eye to determine a relative gaze direction of the eye with respect to the HWD 150. In some embodiments, the eye trackers 160 incorporate the orientation of the HWD 150 and the relative gaze direction with respect to the HWD 150 to determine a gate direction of the user. Assuming for example that the HWD 150 is oriented at a direction 30 degrees from a reference direction, and the relative gaze direction of the HWD 150 is −10 degrees (or 350 degrees) with respect to the HWD 150, the eye trackers 160 may determine that the gaze direction of the user is 20 degrees from the reference direction. In some embodiments, a user of the HWD 150 can configure the HWD 150 (e.g., via user settings) to enable or disable the eye trackers 160. In some embodiments, a user of the HWD 150 is prompted to enable or disable the eye trackers 160.

In some embodiments, the communication interface 165 includes an electronic component or a combination of an electronic component and a software component that communicates with the console 110. The communication interface 165 may communicate with a communication interface 115 of the console 110 through a communication link. The communication link may be a wireless link, a wired link, or both. Examples of the wireless link can include a cellular communication link, a near field communication link, Wi-Fi, Bluetooth, or any communication wireless communication link. Examples of the wired link can include a USB, Ethernet, Firewire, HDMI, or any wired communication link. In the embodiments, in which the console 110 and the head wearable display 150 are implemented on a single system, the communication interface 165 may communicate with the console 110 through a bus connection or a conductive trace. Through the communication link, the communication interface 165 may transmit to the console 110 data indicating the determined location of the HWD 150 and the determined gaze direction of the user. Moreover, through the communication link, the communication interface 165 may receive from the console 110 data indicating image to be rendered.

In some embodiments, the image renderer 170 includes an electronic component or a combination of an electronic component and a software component that generates one or more images for display, for example, according to a change in view of the space of the artificial reality. In some embodiments, the image renderer 170 is implemented as a processor (or a graphical processing unit (GPU)) that executes instructions to perform various functions described herein. The image renderer 170 may receive, through the communication interface 165, data describing an image to be rendered, and render the image through the electronic display 175. In some embodiments, the data from the console 110 may be compressed or encoded, and the image renderer 170 may decompress or decode the data to generate and render the image. In one aspect, the process of detecting, by the HWD 150, the location and the orientation of the HWD 150 and/or the gaze direction of the user wearing the HWD 150, and generating and transmitting, by the console 110, a high resolution image (e.g., 1920 by 1080 pixels) corresponding to the detected location and the gaze direction to the HWD 150 may be computationally exhaustive and may not be performed within a frame time (e.g., less than 11 ms). In one aspect, the image renderer 170 generates one or more images through a shading process and a reprojection process when an image from the console 110 is not received within the frame time. For example, the shading process and the reprojection process may be performed adaptively, according to a change in view of the space of the artificial reality. Hence, a communication bandwidth between the console 110 and the HWD 150 can be reduced, and a high resolution image can be presented to the user without sacrificing fidelity.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HWD 150 is worn by a user, the electronic display 175 is located proximate (e.g., less than 3 inches) to the user's eyes. In one aspect, the electronic display 175 emits or projects light towards the user's eyes, for example through a lens, according to image generated by the image renderer 170.

In some embodiments, the imaging device 180 corresponds to or includes a component that captures one or more images. In one configuration, the imaging device 180 may be shared with or integrated as part of the sensors 155. In some embodiments, the imaging device 180 is affixed to a certain location of the HWD 150, and captures an image of the physical space according to an orientation of the HWD 150. In one configuration, when the HWD 150 is worn by the user, the imaging device 180 is directed towards downward, such that the imaging device 180 can capture an image of the user hand. In some embodiments, the imaging device 180 is implemented separately from the HWD 150, and may be implemented as part of the console 110, or communicatively coupled to the console 110.

In some embodiments, the virtual keyboard controller 190 corresponds to or includes a component that provides a virtual keyboard. In one aspect, the virtual keyboard controller 190 instructs or causes the image renderer 170 to provide an image of the virtual keyboard at a location within a virtual space (e.g., which can be registered with a region or surface in a physical space). The virtual keyboard controller 190 may be communicatively coupled to the imaging device 180. According to the captured image from the imaging device 180, the virtual keyboard controller 190 may track the user hand at a location in a physical space corresponding to the location of the virtual keyboard within the virtual space, and detect a user interaction (e.g., a hand motion and/or a hand pose) with respect to the virtual keyboard according to the tracked user hand. Moreover, the virtual keyboard controller 190 may determine one or more inputs corresponding to the detected user interaction. For example, the virtual keyboard controller 190 can detect a sequence of hand motions and/or hand poses corresponding to pressing keys "C", "A", "T" of a physical keyboard. In some embodiments, the virtual keyboard controller 190 is implemented separately from the HWD 150, and may be implemented as part of the console 110, or communicatively coupled to the console 110.

In some embodiments, the virtual keyboard controller 190 implements a language model 195 to correct any errors (e.g., potential or perceived errors) in the input detected by the hand motion or the hand pose. In one aspect, the language model 195 receives one or more characters, words, and/or sentences, and determines a semantically suitable replacements. For example, the user may have intended to perform a hand motion or a hand pose corresponding to pressing keys "C", "A", "T" of a physical keyboard, but because of a lack of kinesthetic feedback may have performed hand motion(s) and/or hand pose(s) corresponding to "C", "Q", "T", instead. The language model 195 may determine that the user intended to perform hand motion(s) and/or hand pose(s) to provide input for "C", "A", "T". In one aspect, the language model 195 determines a distribution of characters, words, and/or sentences in the detected input according to the hand motion(s) and/or hand pose(s) during a time period, and predicts candidate replacements for one or more characters, words, and/or sentences, according the distribution. In one example, the candidate replacements for one or more characters are identified by one or more adjacent characters in a layout of a physical keyboard. The language model 195 may also determine the candidate replacements according to a weight provided or determined. For example, the language model 195 may determine, for a first weight higher than a second weight, candidate replacements with a larger number of differences in characters or words from the input than a number of differences in characters or words between the input and candidate replacements for the second weight. The virtual keyboard controller 190 may automatically determine the weight according to the user intention of providing semantically meaningful characters, words, and/or sentences or not. For example, the virtual keyboard controller 190 may predict or determine the user intention based on a focus level of the user and/or a type of content of the input. The language model 195 may replace the one or more characters, words, and/or sentences with the candidate replacements. Accordingly, a correction by the language model 195 can be adaptively performed, according to the user intention of providing a semantically meaningful characters, words, and/ or sentences or not. Detailed description on implementations and operations of the virtual keyboard controller 190 are provided below with respect to FIGS. 2-7.

In some embodiments, the console 110 is an electronic component or a combination of an electronic component and a software component that provides content to be rendered to the HWD 150. In one aspect, the console 110 includes a communication interface 115 and a content provider 130. These components may operate together to determine a view of the artificial reality corresponding to the location of the HWD 150 and the gaze direction of the user of the HWD 150, and can generate an image of the artificial reality corresponding to the determined view. In other embodiments, the console 110 includes more, fewer, or different components than shown in FIG. 1. In some embodiments, the console 110 is integrated as part of the HWD 150.

In some embodiments, the communication interface 115 is an electronic component or a combination of an electronic component and a software component that communicates with the HWD 150. The communication interface 115 may be a counterpart component to the communication interface 165 to communicate with a communication interface 115 of the console 110 through a communication link. Through the communication link, the communication interface 115 may receive from the HWD 150 data indicating the determined location and orientation of the HWD 150 and/or the determined gaze direction of the user. Moreover, through the communication link, the communication interface 115 may transmit to the HWD 150 data describing an image to be rendered.

The content provider 130 corresponds to or includes a component that generates content to be rendered according to the location and orientation of the HWD 150 and/or the gaze direction of the user of the HWD 150. In one aspect, the content provider 130 determines a view of the artificial reality according to the location and orientation of the HWD 150 and/or the gaze direction of the user of the HWD 150. For example, the content provider 130 maps the location of the HWD 150 in a physical space to a location within a virtual space, and determines a view of the virtual space along a direction corresponding to the orientation of the HWD 150 and the gaze direction of the user from the mapped location in the virtual space. The content provider 130 may generate image data describing an image of the determined view of the virtual space, and transmit the image data to the HWD 150 through the communication interface 115. In some embodiments, the content provider 130 generates metadata including motion vector information, depth information, edge information, object information, etc., associated with the image, and transmits the metadata with the image data to the HWD 150 through the communication interface 115. The content provider 130 may compress and/or encode the data describing the image, and can transmit the compressed and/or encoded data to the HWD 150. In some embodiments, the content provider 130 generates and provides the image to the HWD 150 periodically (e.g., every one second).

Figure 2:
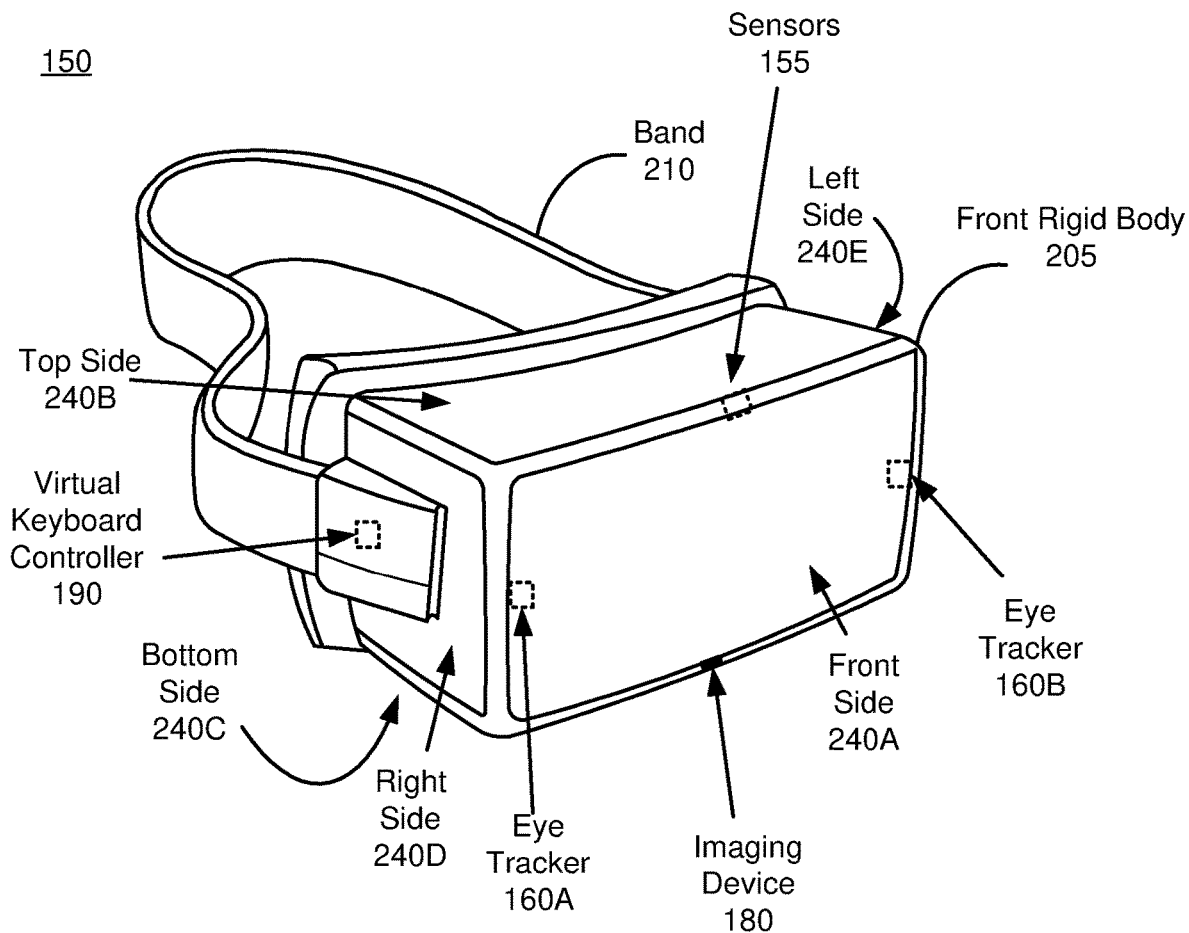
FIG. 2 is a diagram of a head wearable display, according to an example implementation of the present disclosure.

FIG. 2 is a diagram of the HWD 150, in accordance with an example embodiment. In some embodiments, the HWD 150 includes a front rigid body 205 and a band 210. The front rigid body 205 includes the electronic display 175 (not shown in FIG. 2), the sensors 155, the eye trackers 160A, 160B, one or more imaging devices 180, and the virtual keyboard controller 190. In the embodiment shown by FIG. 2, the sensors 155 are located within the front rigid body 205, and the sensors 155 are not visible to the user. In other embodiments, the HWD 150 has a different configuration than shown in FIG. 2. For example, the one or more imaging devices 180, the virtual keyboard controller 190, the eye trackers 160A, 160B, and/or the sensors 155 may be in different locations than shown in FIG. 2.

Figure 3:
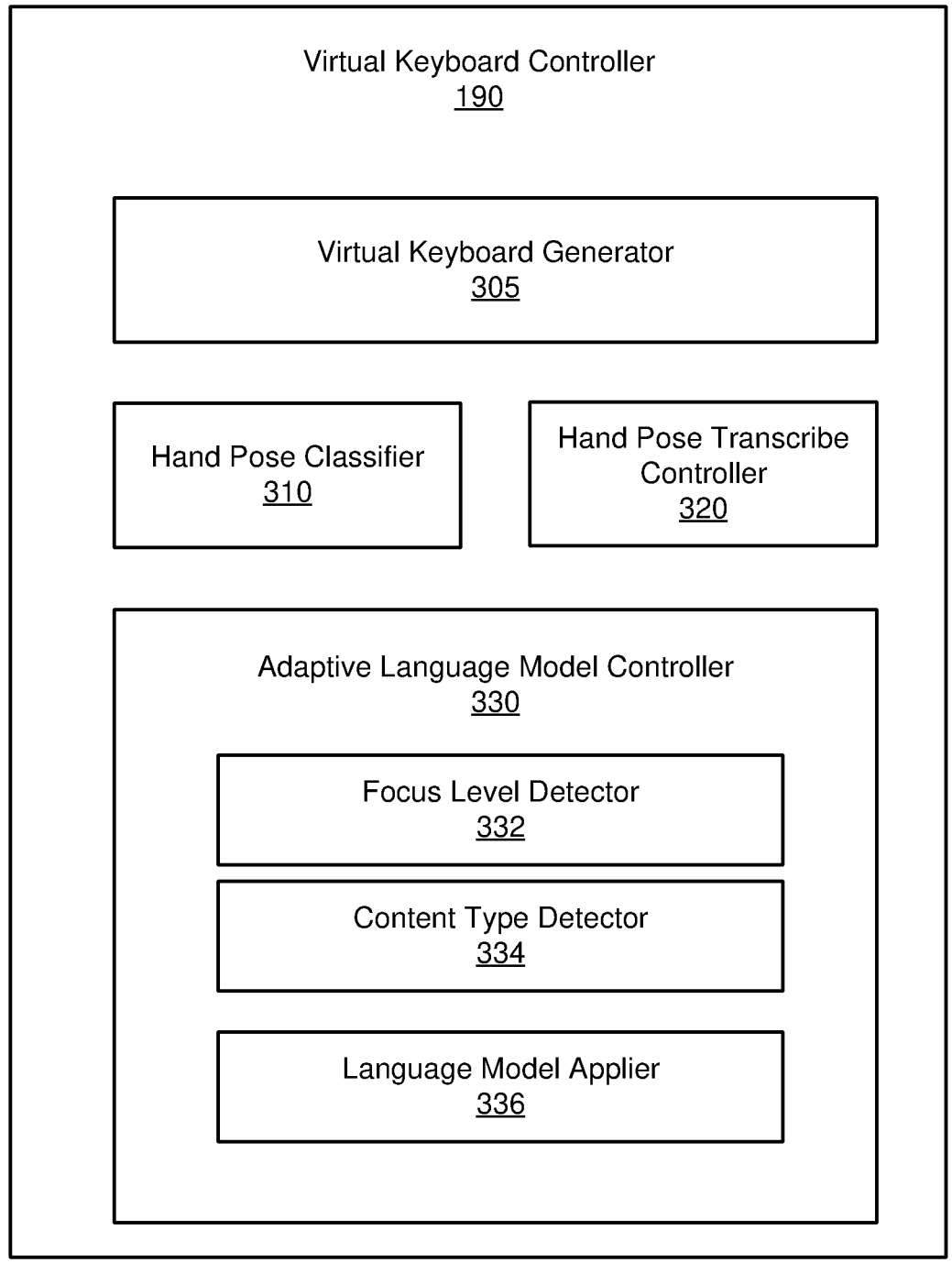
FIG. 3 is a diagram of a virtual keyboard controller, according to an example implementation of the present disclosure.

FIG. 3 is a diagram of the virtual keyboard controller 190, according to an example implementation of the present disclosure. In some embodiments, the virtual keyboard controller 190 includes a virtual keyboard generator 305, a hand pose classifier 310, a hand pose transcribe controller 320, and an adaptive language model controller 330. These components may operate together to present a virtual keyboard in an artificial reality, and detect a hand motion and/or a hand pose of the user with respect to the virtual keyboard. In one aspect, an input corresponding to the hand motion and/or the hand pose is adaptively modified, corrected or updated according to the language model 195. The input may be provided to the artificial reality application. In some embodiments, the virtual keyboard controller 190 includes more, fewer, or different components than shown in FIG. 3.

In some embodiments, the virtual keyboard generator 305 corresponds to or includes a component that generates a virtual keyboard. In one aspect, the virtual keyboard generator 305 generates the virtual keyboard at a location within a virtual space corresponding to a location with a physical space. In one example, the location within the virtual space may correspond to a region and/or surface of a desk or a table in the physical space. In one application, the virtual keyboard generator 305 prompts or allows a user to determine or define the location of the physical space corresponding to the location of the virtual space, at which the virtual keyboard can be located. The virtual keyboard generator 305 may cause or configure the image renderer 170 to generate an image or a model of the virtual keyboard at the location of the virtual space.

In some embodiments, the hand pose classifier 310 corresponds to or includes a component that determines a hand motion or a hand pose of the user hand in an image captured by the imaging device 180. In one aspect, the hand pose classifier 310 detects features (e.g., outer shape) of the user hand in the image by performing an image processing, and determines a hand pose or a hand motion according to the detected features. The hand pose classifier 310 may detect a trajectory of detected features in two or more images, and determine a hand motion. For example, the hand pose classifier 310 detects a pressing motion of an index finger of a left hand and subsequently detects a pressing motion of a thumb of a right hand.

In some embodiments, the hand pose transcribe controller 320 corresponds to or includes a component that determines an input according to the detected hand pose or hand motion from the hand pose classifier 310. In one approach, the hand pose transcribe controller 320 includes or stores mapping information indicating a relationship between different hand motions or poses and corresponding inputs. The hand pose transcribe controller 320 may apply the detected hand motion or hand pose to the mapping information, and determine or identify an input corresponding to the detected hand motion or hand pose. For example, the hand pose transcribe controller 320 may determine that the pressing motion (e.g., including trajectory and/or location) of the index finger of the left hand corresponds to an input character "f", according to the mapping information. For another example, the hand pose transcribe controller 320 may determine that the pressing motion of an index finger of a right hand corresponds to an input character "j", according to the mapping information.

In some embodiments, the adaptive language model controller 330 corresponds to or includes a component that adaptively applies a language model to modify the transcribed input from the hand pose transcribe controller 320. In some embodiments, the adaptive language model controller 330 includes a focus level detector 332, a content type controller 334, and a language model applier 336. These components may operate together to determine an intent of the user (e.g., according to a focus level of the user) providing the input, and may adaptively adjust weight of the language model 195 according to the determined intent. In some embodiments, the adaptive language model controller 330 includes more, fewer, or different components than shown in FIG. 3.

In some embodiments, the focus level detector 332 corresponds to or includes a component that determines a focus level of the user providing input via the virtual keyboard. In one approach, the focus level detector 332 determines the focus level according to a speed of the hand motion. For example, in response to determining that a speed of the hand motion is increased, constant and/or within a range, the focus level detector 332 may determine that the focus level is decreased. For example, in response to determining that a speed of the hand motion is decreased, irregular and/or within another range, the focus level detector 332 may determine that the focus level is increased. In one approach, the focus level detector 332 determines the focus level according to a gaze direction determined according to the sensors 155 and/or the eye tracker 160. For example, in response to determining that a gaze direction is towards the virtual keyboard (e.g., within a specific directional range or threshold), the focus level detector 332 may determine that the focus level is increased. For example, in response to determining that the gaze direction is away from the virtual keyboard (e.g., beyond a specific directional range or threshold), the focus level detector 332 may determine that the focus level is decreased. According to the determined focus level, a weight of the language model 195 can be set or adjusted.

In some embodiments, the content type detector 334 corresponds to or includes a component that determines a type of content, for which the input is provided. In one approach, the content type detector 334 detects a type of content, from multiple types of predetermined content. Some types of content may be determined to have more semantically meaningful characters, words, and/or sentences than other types of content. For example, an email draft, a document, and a chat application are determined to have more semantically meaningful characters, words, and/or sentences compared to an entry for a password, a proper noun, an address field, etc. According to the determined type of content, the weight of the language model 195 can be set or adjusted.

The language model applier 336 corresponds to or includes a component that applies the language model 195 to adjust the input detected by the hand pose transcribe controller 320 according to weight of the language model 195. In one aspect, the language model applier 336 adjusts the weight of the language model 195 according to the determined focus level from the focus level detector 332 and/or the determined type of content from the content type detector 334. For example, the language model applier 336 may increase the weight of the language model 195 (e.g., to support a correspondingly and/or relatively greater level of corrections to inputs), in response to a lower focus level. For example, the language model applier 336 may decrease the weight of the language model 195 (e.g., to support a relatively lower level of corrections to inputs), in response to a higher focus level. For example, the language model applier 336 may increase the weight of the language model 195, in response to the type of content determined to be one of an email draft, a document, and a chat application (e.g., content associated with relatively lower focus level). For example, the language model applier 336 may decrease the weight of the language model 195, in response to the type of content determined to be one of an entry for a password, a proper noun, an address field, etc. (e.g., content associated with relatively higher focus level). In one aspect, the higher weight applied to the language model 195 may allow more corrections of characters, words, and/or sentences by semantically meaningful replacements. Similarly, the lower weight applied to the language model 195 may allow less corrections of characters, words, and/or sentences by semantically meaningful replacements.

Figure 4A:
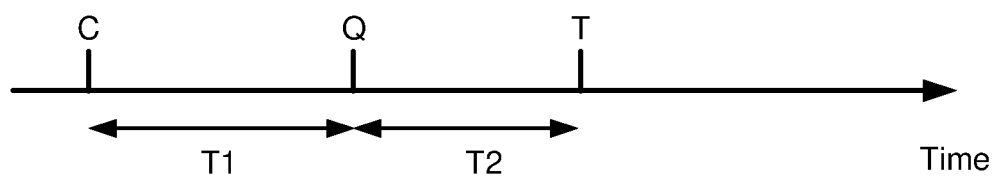
FIGS. 4A and 4B are example timing diagrams of input detected based on hand motions, according to an example implementation of the present disclosure.
Figure 4B:
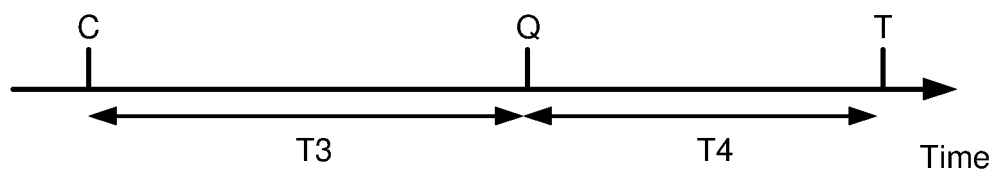

FIGS. 4A and 4B are example timing diagrams 400A, 400B of input detected based on hand motions, according to an example implementation of the present disclosure. In one example, in the timing diagram 400A, a time period T1 exists between a hand motion corresponding to a character "C" and a hand motion corresponding to a character "Q", and a time period T2 exists between the hand motion corresponding to the character "Q" and a hand motion corresponding to a character "T". In one example, in the timing diagram 400B, a time period T3 exists between a hand motion corresponding to a character "C" and a hand motion corresponding to a character "Q", and a time period T4 exists between the hand motion corresponding to the character "Q" and a hand motion corresponding to a character "T". In one example, the time periods T1, T2 are less than the time periods T3, T4.

In one aspect, the focus level detector 332 may determine the focus level according to a speed of the hand motion detected. In the examples in FIGS. 4A and 4B, the focus level detector 332 may determine that the focus level of the user providing input in the timing diagram 400B is higher than the focus level of the user providing input in the timing diagram 400A, because the time periods T3, T4 are larger than the time periods T1, T2. Accordingly, the language model applier 336 may apply a lower weight to the language model 195 for the characters "C", "Q", "T" received in the timing diagram 400B compared to a weight applied to the language model 195 for the characters "C", "Q", "T" received in the timing diagram 400A. Hence, the language model 195 may correct the characters "C", "Q", "T" with a semantically meaningful word "C", "A", "T" in the timing diagram 400A, but not in the timing diagram 400B.

Figure 5B:
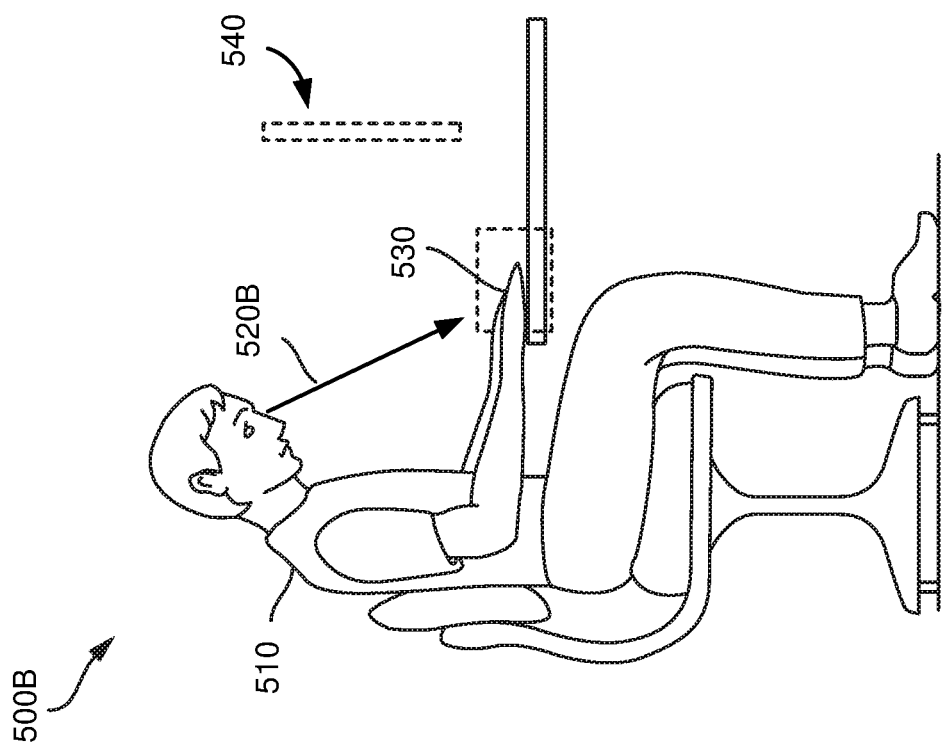
FIGS. 5A and 5B are example diagrams of a user providing inputs through a virtual keyboard with different gaze directions, according to an example implementation of the present disclosure.
Figure 5A:
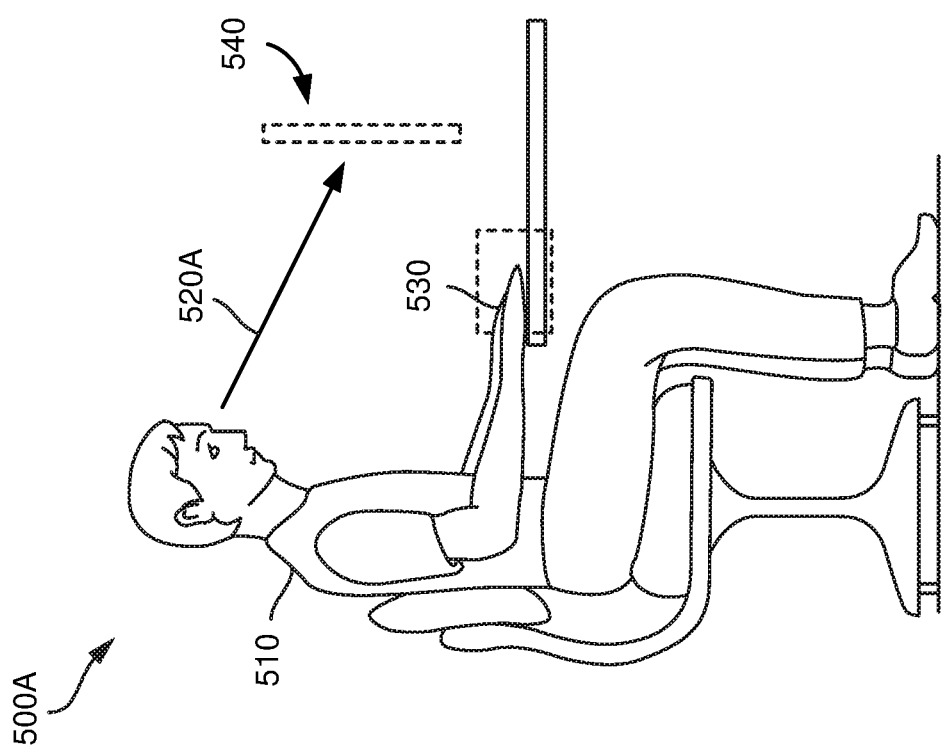

FIGS. 5A and 5B are example diagrams 500A, 500B of a user 510 providing inputs through a virtual keyboard with different gaze directions, according to an example implementation of the present disclosure. In one application, the user 510 may wear the HWD 150 (not shown for simplicity) to view a virtual screen 540 in the virtual reality, and provide inputs to the virtual reality through a virtual keyboard 530. In FIG. 5A, the user 510 may view, via the HWD 150, the virtual screen 540 along a direction 520A, while providing inputs through the virtual keyboard 530. In FIG. 5B, the user 510 may view, via the HWD 150, the hands or the virtual keyboard 530 along a direction 520B, while providing inputs through the virtual keyboard 530. In one application, the user 510 may view a physical monitor coupled to the console 110 instead of the virtual screen 540 (e.g., without using the HWD 150), and provide inputs to the console 110 through the virtual keyboard 530.

In one aspect, the focus level detector 332 determines the focus level according to the gaze direction 520. The gaze direction 520 may be determined by the eye trackers 160. The gaze direction 520 may be also determined according to an orientation of the HWD 150 based on one or more sensors 155. In the examples in FIGS. 5A and 5B, the focus level detector 332 may determine that the focus level of the user with the gaze direction 520B towards the virtual keyboard 530 is higher than the focus level of the user with the gaze direction 520A. Accordingly, the language model applier 336 may apply a lower weight to the language model 195 for inputs provided with the gaze direction 520B compared to a weight applied to the language model 195 for inputs provided with the gaze direction 520A.

Figure 6A:
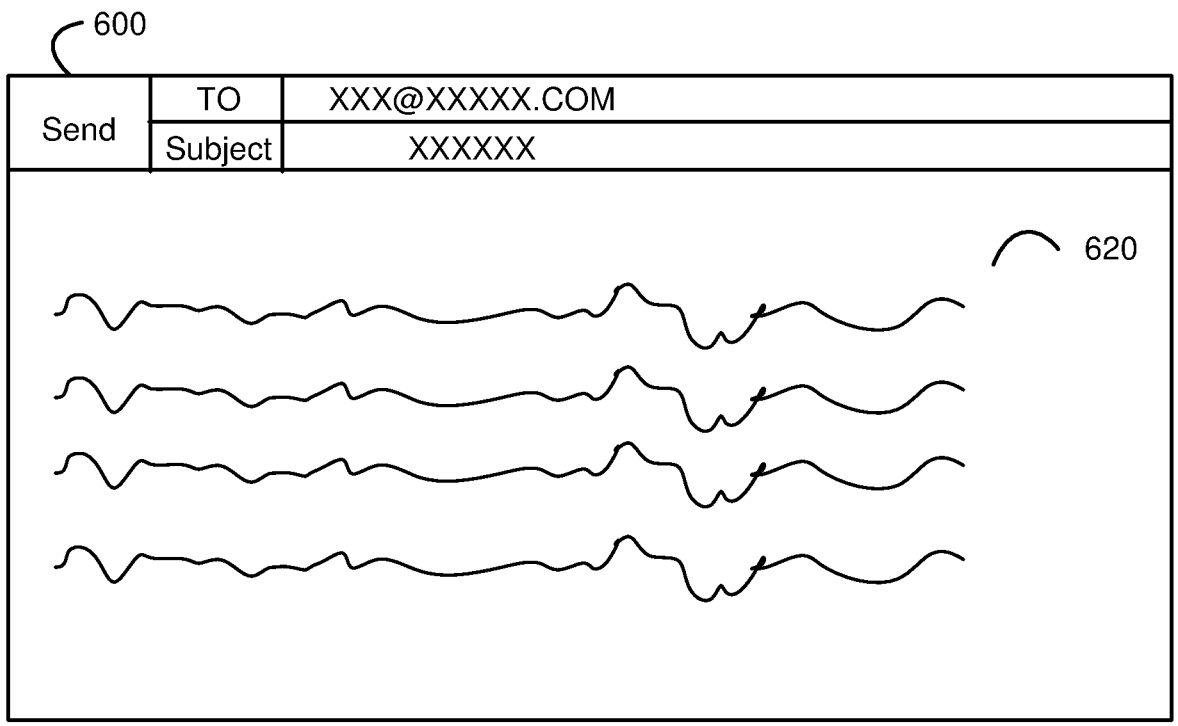
FIGS. 6A and 6B are example interfaces, to which different contents are provided, according to an example implementation of the present disclosure.
Figure 6B:
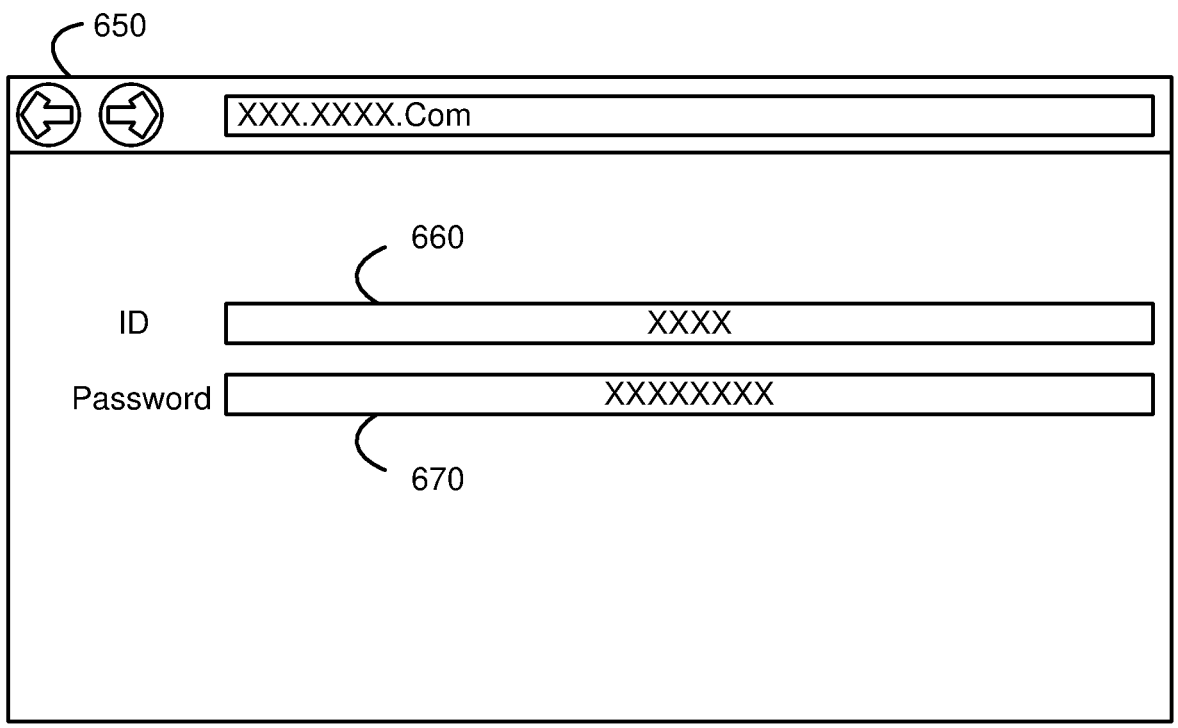

FIGS. 6A and 6B are example interfaces 600, 650, to which different contents are provided, according to an example implementation of the present disclosure. In one example, the interface 600 is an email application 620, where the user can provide texts. In one example, the interface 650 is an access interface (e.g., of a web application), to which the user can provide an identification 660 and a password 670 to obtain access to other content.

In one aspect, the content type detector 334 determines the focus level according to the content type. In one example of content types, an email draft, a document, and a chat application are determined to have more semantically meaningful characters, words, and/or sentences compared to an entry for a password, a proper noun, an address field, etc. Accordingly, in the examples in FIGS. 6A and 6B, the content type detector 334 may determine that the email application 620 has or is assigned to a higher weight of the language model 195 than a weight of the language model 195 for the identification 660 and the password 670. Hence, the language model 195 may correct inputs provided to the email application 620, but not to the identification 660 and the password 670.

Figure 7:
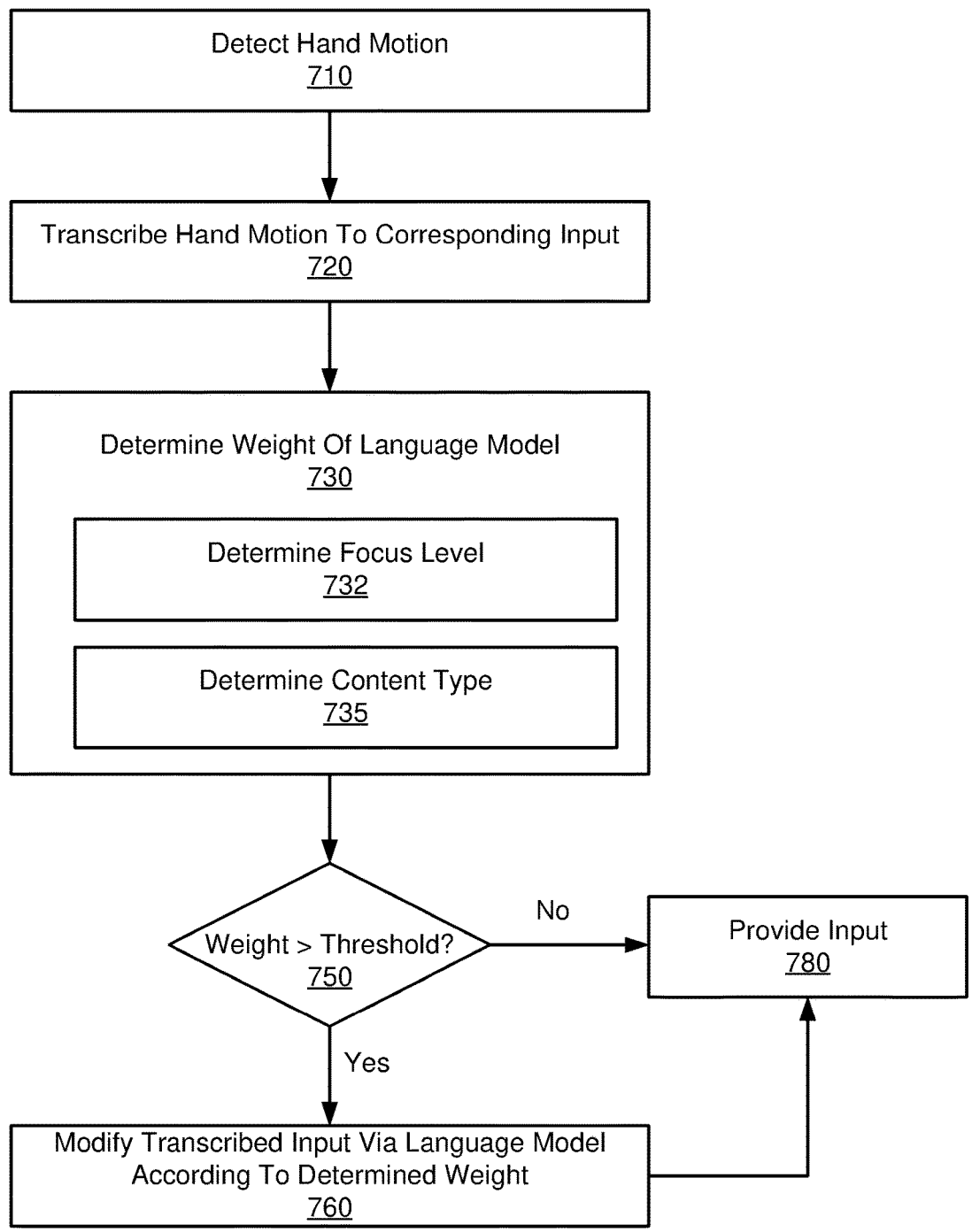
FIG. 7 is a flow chart illustrating a process of providing inputs through a virtual keyboard with an adaptive language model, according to an example implementation of the present disclosure.

FIG. 7 is a flow chart illustrating a process 700 of providing inputs through a virtual keyboard with an adaptive language model 195, according to an example implementation of the present disclosure. In some embodiments, the process 700 is performed by the virtual keyboard controller 190. In some embodiments, the process 700 is performed by other entities. For example, the process 700 may be performed by the console 110, or by the HWD 150 and the console 110 together. In some embodiments, the process 700 includes more, fewer, or different steps than shown in FIG. 7.

In one approach, the virtual keyboard controller 190 detects 710 a hand motion. For example, the virtual keyboard controller 190 detects features (e.g., an outer shape, finger locations, motion) of the user hand in an image by performing an image processing on the image, and determines a hand pose and/or a hand motion according to the detected features. The virtual keyboard controller 190 may detect a trajectory of detected features in two or more images, and may determine a hand motion. For example, the virtual keyboard controller 190 detects a pressing motion of an index finger of a left hand and subsequently detects a pressing motion of a thumb of a right hand.

In one approach, the virtual keyboard controller 190 transcribes 720 the hand motion to a corresponding input. In one approach, the virtual keyboard controller 190 includes or stores mapping information indicating a relationship between different hand motions/poses and corresponding inputs. The virtual keyboard controller 190 may apply the detected hand motion or hand pose to the mapping information, and determine or identify an input corresponding to the detected hand motion or hand pose. For example, the virtual keyboard controller 190 may determine that the pressing motion of the index finger of the left hand corresponds to an input character "f", according to the mapping information. For another example, the hand pose transcribe controller 320 may determine that the pressing motion of an index finger of a right hand corresponds to an input character "j", according to the mapping information.

In one approach, the virtual keyboard controller 190 determines 730 the weight of the language model 195. The virtual keyboard controller 190 may determine the weight of the language model 195 according to a focus level, a content type, or both.

In one approach, the virtual keyboard controller 190 determines 732 a focus level of the user providing inputs. In one example, the virtual keyboard controller 190 determines the focus level according to a speed of the hand motion. For example, in response to determining that a speed of the hand motion is increased, constant or within a certain range, the virtual keyboard controller 190 may determine that the focus level is decreased. For example, in response to determining that a speed of the hand motion is decreased, irregular or in a particular range, the virtual keyboard controller 190 may determine that the focus level is increased. In one example, the virtual keyboard controller 190 determines the focus level according to a gaze direction determined according to the sensors 155 and/or the eye tracker 160. For example, in response to determining that a gaze direction is towards the virtual keyboard, the virtual keyboard controller 190 may determine that the focus level is increased. For example, in response to determining that the gaze direction is away from the virtual keyboard, the virtual keyboard controller 190 may determine that the focus level is decreased. According to the determined focus level, a weight of the language model 195 can be set or adjusted.

In one approach, the virtual keyboard controller 190 determines 735 a type of content, from multiple predetermined types of content. In one approach, each content or application is assigned to or associated with a corresponding type. When a user provides an input to a particular content or application, a corresponding type of content can be determined or identified. Some types of content may be determined to have more semantically meaningful characters, words, and/or sentences than other types of content. For example, an email draft, a document, and a chat application may be determined to have more semantically meaningful content such as characters, words, and/or sentences compared to an entry for a password, a proper noun, an address field, etc. According to the determined type of content, a weight of the language model 195 can be set or adjusted.

In one approach, the virtual keyboard controller 190 determines 750 whether the determined weight exceeds a predetermined threshold. In response to determining that the determined weight is not exceeding the predetermined threshold, the virtual keyboard controller 190 may provide 780 the transcribed input according to the hand motion and/or the hand pose without applying the language model 195 to the transcribed input. In response to determining that the determined weight exceeding the predetermined threshold, the virtual keyboard controller 190 may modify 760 the transcribed input via the language model 195 according to the determined weight, and provide 780 the modified input. For example, the language model 195 determines a distribution of characters, words, and/or sentences in the transcribed input according to the hand motion and/or hand pose and the determined weight during a time period, and predicts candidate replacements for one or more characters, words, and/or sentences, according the distribution. Moreover, the language model 195 may replace one or more characters, words, and/or sentences in the transcribed input with the one or more characters, words, and/or sentences of the predicted candidate replacements.

Advantageously, adaptively modifying, correcting or adjusting an input provided to the virtual keyboard via a language model can improve an accuracy or correctness of the input provided. In one aspect, inputs to the virtual keyboard based on the hand motion or the hand pose may be susceptible to errors, because the virtual keyboard cannot provide any kinesthetic feedback. Without a kinesthetic feedback, a user may perform a hand motion or a hand pose different than his/her intention. In one aspect, the user intention of providing semantically meaningful characters, word, and/or sentences or not can be predicted or determined, for example, based on a focus level of the user or a type of content of the input, and a language model can be adaptively applied according to the user intention to correct the input detected based on the hand motion or the hand pose. Accordingly, a correction by the language model can be adaptively performed, according to the user intention of providing a semantically meaningful word or not.

Figure 8:
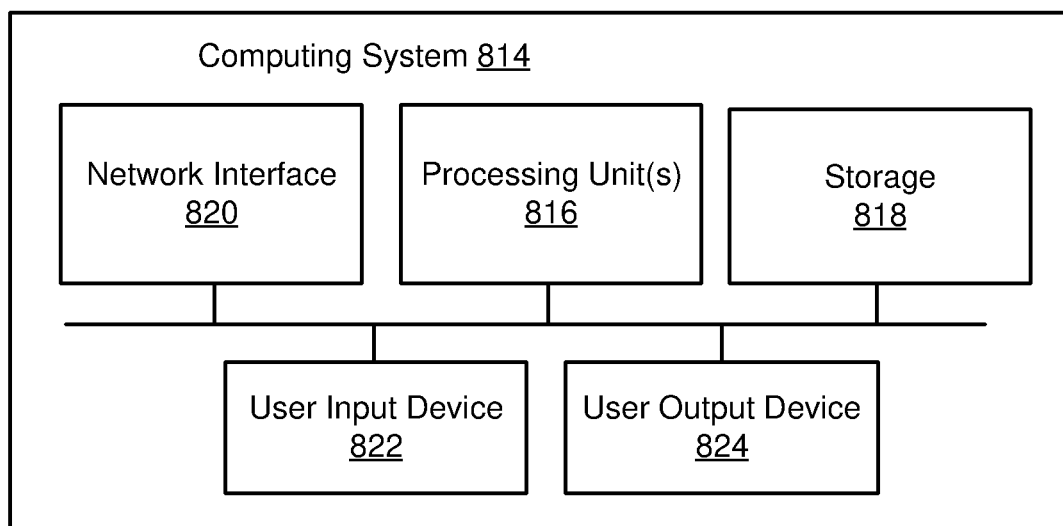
FIG. 8 is a block diagram of a computing environment according to an example implementation of the present disclosure.

Various operations described herein can be implemented on computer systems. FIG. 8 shows a block diagram of a representative computing system 814 usable to implement the present disclosure. In some embodiments, the console 110, the HWD 150 or both of FIG. 1 are implemented by the computing system 814. Computing system 814 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 814 can be implemented to provide VR, AR, MR experience. In some embodiments, the computing system 814 can include conventional computer components such as processors 816, storage device 818, network interface 820, user input device 822, and user output device 824.

Network interface 820 can provide a connection to a wide area network (e.g., the Internet) to which WAN interface of a remote server system is also connected. Network interface 820 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 822 can include any device (or devices) via which a user can provide signals to computing system 814; computing system 814 can interpret the signals as indicative of particular user requests or information. User input device 822 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 824 can include any device via which computing system 814 can provide information to a user. For example, user output device 824 can include a display to display images generated by or delivered to computing system 814. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 824 can be provided in addition to or instead of a display. Examples include indicator lights, speakers, tactile "display" devices, printers, and so on.

Some implementations include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 816 can provide various functionality for computing system 814, including any of the functionality described herein as being performed by a server or client, or other functionality associated with message management services.

It should be appreciated that computing system 814 is illustrative and that variations and modifications are possible. Computer systems used in connection with the present disclosure can have other capabilities not specifically described here. Further, while computing system 814 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
    determining, by one or more processors, a level of focus of a user when providing a hand motion with respect to a virtual keyboard, using data from at least one sensor including an image sensor communicably coupled to the one or more processors, the data indicative of a gaze or face direction of the user relative to a position of the virtual keyboard, wherein determining the level of focus of the user when providing the hand motion includes determining, by the one or more processors, a speed of the hand motion using the data acquired by the image sensor;
    detecting, by the one or more processors via the image sensor, an input to the virtual keyboard based on the hand motion;
    determining, by the one or more processors, weight of a language model according to the data indicative of the gaze or face direction of the user relative to the position of the virtual keyboard; and
    modifying, by the one or more processors, the detected input according to the determined weight of the language model.

2. The method of claim 1, wherein determining the level of focus of the user when providing the hand motion includes:
    determining, by the one or more processors, an orientation of a head of the user.

3. The method of claim 2, wherein determining the weight of the language model includes:
    determining, by the one or more processors, the weight to be a first value, in response to determining that the head is oriented to face towards the virtual keyboard, and
    determining, by the one or more processors, the weight to be a second value, in response to determining that the head is oriented to face away from the virtual keyboard, the second value higher than the first value.

4. The method of claim 1, wherein determining the level of focus of the user when providing the hand motion includes:
    determining, by the one or more processors, the gaze direction of the user.

5. The method of claim 4, wherein determining the weight of the language model includes:
    determining, by the one or more processors, the weight to be a first value, in response to determining that the gaze direction of the user is directed to the virtual keyboard, and
    determining, by the one or more processors, the weight to be a second value, in response to determining that the gaze direction of the user is away from the virtual keyboard, the second value higher than the first value.

6. The method of claim 1, wherein determining the weight of the language model includes:
    determining, by the one or more processors, the weight to be a first value, in response to determining that the speed of the hand motion is less than a predetermined threshold, and
    determining, by the one or more processors, the weight to be a second value, in response to determining that the speed of the hand motion is higher than the predetermined threshold, the second value higher than the first value.

7. The method of claim 1, further comprising:
    determining, by the one or more processors, a type of content corresponding to the input,
    wherein the weight of the language model is determined according to the determined type of content.

8. The method of claim 1, wherein modifying, by the one or more processors, the detected input according to the determined weight of the language model includes:
    determining, by the one or more processors, a distribution of first characters in the detected input during a time period,
    predicting, by the one or more processors via the language model according to the determined weight and the distribution of the first characters, semantically meaningful characters, one or more characters in the semantically meaningful characters different from one or more corresponding characters in the first characters, and
    replacing the one or more corresponding characters with the one or more characters.

9. A device comprising:
    at least one processor configured to:
        determine a level of focus of a user when providing a hand motion with respect to a virtual keyboard, using data from at least one sensor including an image sensor communicably coupled to the at least one processor, the data indicative of a gaze or face direction of the user relative to a position of the virtual keyboard, wherein the at least processor is configured to determine the level of focus of the user when providing the hand motion by determining a speed of the hand motion using the data acquired by the image sensor,
        detect, via the image sensor, an input to the virtual keyboard based on the hand motion,
        determine weight of a language model according to the data indicative of the gaze or face direction of the user relative to the position of the virtual keyboard, and modify the detected input according to the determined weight of the language model.

10. The device of claim 9, wherein the at least one processor is configured to determine the level of focus of the user when providing the hand motion by determining an orientation of a head of the user.

11. The device of claim 9, wherein the at least one processor is configured to determine the level of focus of the user when providing the hand motion by determining the gaze direction of the user.

12. The device of claim 9, wherein the at least one processor is configured to determine a type of content corresponding to the input, wherein the at least one processor is configured to determine the weight of the language model according to the determined type of content.

13. The device of claim 9, wherein the at least one processor is configured to modify the detected input according to the determined weight of the language model by:
   determining a distribution of first characters in the detected input during a time period,
   predicting, via the language model according to the determined weight and the distribution of the first characters, semantically meaningful characters, one or more characters in the semantically meaningful characters different from one or more corresponding characters in the first characters, and
   replacing the one or more corresponding characters with the one or more characters.

14. A non-transitory computer readable medium storing instructions when executed by at least one processor cause the at least one processor to:
   determine a level of focus of a user when providing a hand motion with respect to a virtual keyboard, using data from at least one sensor including an image sensor communicably coupled to the at least one processor, the data indicative of a gaze or face direction of the user relative to a position of the virtual keyboard, wherein the at least one processor is configured to determine the level of focus of the user when providing the hand motion by determining a speed of the hand motion using the data acquired by the image sensor;
   detect, via the image sensor, an input to the virtual keyboard based on the hand motion;
   determine weight of a language model according to the data indicative of the gaze or face direction of the user relative to the position of the virtual keyboard; and
   modify the detected input according to the determined weight of the language model.

15. The non-transitory computer readable medium of claim 14, wherein the instructions when executed by the at least one processor cause the at least one processor to determine the level of focus of the user when providing the hand motion by determining an orientation of a head of the user.

16. The non-transitory computer readable medium of claim 14, wherein the instructions when executed by the at least one processor cause the at least one processor to determine the level of focus of the user when providing the hand motion by determining the gaze direction of the user.

17. The non-transitory computer readable medium of claim 14, wherein the instructions when executed by the at least one processor cause the at least one processor to:
   determine a type of content corresponding to the input, and
   determine the weight of the language model according to the determined type of content.

* * * * *